United States Patent [19]

Nishimoto et al.

[11] Patent Number: 5,170,217
[45] Date of Patent: Dec. 8, 1992

[54] OBJECT MEASURING APPARATUS USING LIGHTWAVE INTERFERENCE

[75] Inventors: Yoshifumi Nishimoto; Masaru Ohtsuka; Satoshi Haya, all of Yokohama, Japan

[73] Assignee: Canon Kabushiki Kaisha, Tokyo, Japan

[21] Appl. No.: 875,592

[22] Filed: Apr. 28, 1992

Related U.S. Application Data

[63] Continuation of Ser. No. 501,886, Mar. 30, 1990, abandoned.

[30] Foreign Application Priority Data

Mar. 31, 1989 [JP] Japan ................ 1-82341
Mar. 31, 1989 [JP] Japan ................ 1-82342

[51] Int. Cl.$^5$ .................................... G01B 9/02
[52] U.S. Cl. .................................... 356/359; 356/345
[58] Field of Search ............ 356/345, 349, 351, 358, 356/359, 360, 363

[56] References Cited

U.S. PATENT DOCUMENTS

4,139,304 2/1979 Redman et al. ............ 356/358
4,340,304 4/1982 Massie ............ 356/351

Primary Examiner—Samuel A. Turner
Attorney, Agent, or Firm—Fitzpatrick, Cella, Harper & Scinto

[57] ABSTRACT

An object measuring apparatus uses lightwave interference by coherent beams. A single light beam having two lightwave components with a phase difference that changes in time is divided so that one lightwave component is applied to the object and the other lightwave component is applied to a reference surface. The lightwave components for the object and the reference surface are interfered with each other and a change in the interference light is detected.

34 Claims, 2 Drawing Sheets

OBJECT MEASURING APPARATUS USING LIGHTWAVE INTERFERENCE

This application is a continuation of application Ser. No. 07/501,886 filed Mar. 30, 1990 now abandoned.

BACKGROUND OF THE INVENTION

1. Field of the Invention

The present invention relates to an object measuring apparatus using a so-called fringe scanning interference method for measuring the configuration or the like of an object by performing fringe scanning wherein a phase difference between a reference light and a light from an object is caused to change with time.

2. Related Background Art

Figure 3:
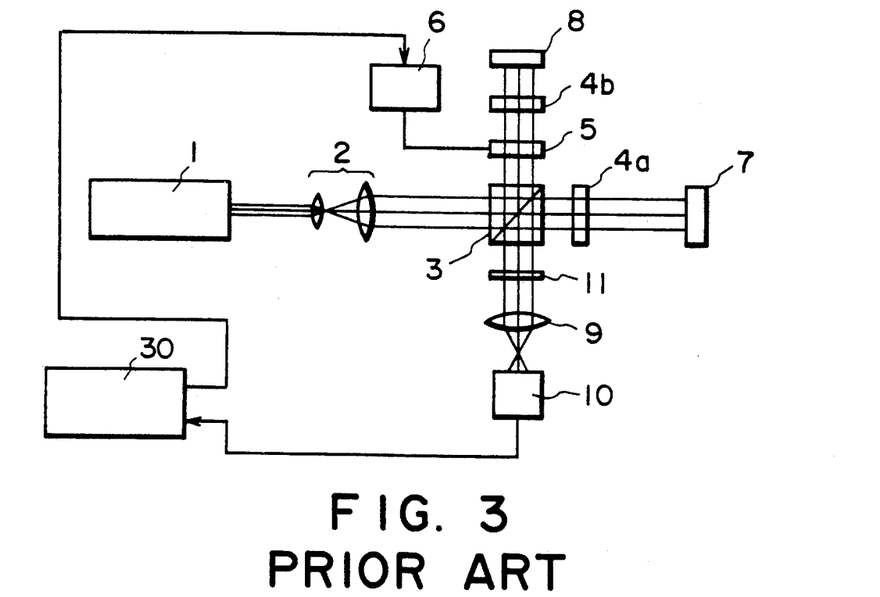
FIGS. 3 and 4 are schematic diagrams showing the structures of the apparatus according to the prior art.

There is known an object measuring apparatus using lightwave interference as shown in FIG. 3.

In FIG. 3, reference numeral 1 represents a laser light source for generating a coherent light beam, 2 a beam expander optical system, 3 a polarized light beam splitter, 4a and 4b a quarter wavelength plate, 5 an electro-optical element, 6 a power source for applying a voltage changing with time to the electro-optical element 5 to change the degree of optical anisotropy of the electro-optical element 5, 7 an object to be measured, 8 a reference mirror, 9 a lens, 10 a photodetector constructed of a plurality of light receiving elements such as CCDs disposed two-dimensionally, 11 a polarizing plate, and 30 a control circuit.

The diameter of a light beam from the laser light source 1 is made longer by the beam expander optical system 2, and applied to the polarized beam splitter 3. In accordance with the polarization direction, the incident light beam is transmitted to the quarter wavelength plate 4a or reflected to the electro-optical element 5 and quarter wavelength plate 4b. The transmitted beam component is changed to a circularly polarized wave by the quarter wavelength plate, reflected by the object 7 to be measured, again applied to the quarter wavelength plate 4a with its polarization plane having been rotated by 90 degrees from that when it was first applied thereto, and returned to the polarized beam splitter 3. This beam from the object 7 to be measured is therefore reflected by the polarized beam splitter 3 in this time downward as viewed in FIG. 3.

On the other hand, the reflected beam component having a polarization plane, e.g., in the direction vertical to the drawing surface, is transmitted through the electro-optical element 5 having a properly directed optical axis because of the refractive index for an extraordinary light beam, and is applied to the quarter wavelength plate 4b, and reflected by the reference mirror 8. The reflected beam is again applied to the quarter wavelength plate 4b with its polarization plane having been rotated by 90 degrees from that when it was first applied thereto, and then applied to the electro-optical element 5. This reflected beam component therefore is transmitted through the electro-optical element 5 because of the refractive index for an ordinary light beam, and to the polarized beam splitter 3 to be directed downward as viewed in FIG. 3.

The reference light beam from the reference mirror 8 and the light beam from the object 7 are superposed together and applied via the properly disposed polarizing plate 11 and lens 9 to the photodetector 10. Both the light beams interfered with each other at the interface of the polarized beam splitter 3 pass through the polarizing plate 11 so that they are detected by a plurality of light receiving elements of the photodetector 10 as a distribution of interference fringes. An output of the photodetector 10 is supplied to the control circuit 30.

The degree of optical anisotropy of the electro-optical element changes considerably with an applied voltage changing with time. The ordinary and extraordinary refractive indices change (as the former increases, the latter decrease, or vice versa) so that the phase of the reflected beam component transmitted two times through the electro-optical element is caused to change. The phase difference between the reference light beam and the light beam from the object 7 therefore changes so that the interference fringes on the photodetector 10 are caused to move. The moving interference fringe data are picked up in synchronization with the operation of the power source 6 by which the optical anisotropy of the electro-optical element 5 is changed, and analyzed by a computer within the control circuit 30 to thereby measure the flatness, configuration or the like of the object 7 or the amount of motion of the object 7. This measurement method is called a fringe scanning interference method. According to this method, errors caused by atmospheric fluctuation, noises or the like can be minimized and a more precise measurement can be realized. The details of this method is described, e.g., in the document by S. Yokozeki, K. Patorski and K. Ohnishi Optics Commun., 14 (1975) 401, in "Digital Wavefront Measuring Interferometer for Testing Optical Surfaces and Lenses": Applied Optics, Vol. 13, No. 11, Nov. 1974, and in other documents.

There is also known another arrangement without the electro-optical element 5 wherein the phase difference between the reference light beam and the light beam from the object 7 is changed by moving the reference mirror 8 with a piezoelectric element for example. This arrangement will be described with reference to FIG. 4 wherein identical reference numerals denote like elements to those shown in FIG. 3.

Figure 4:
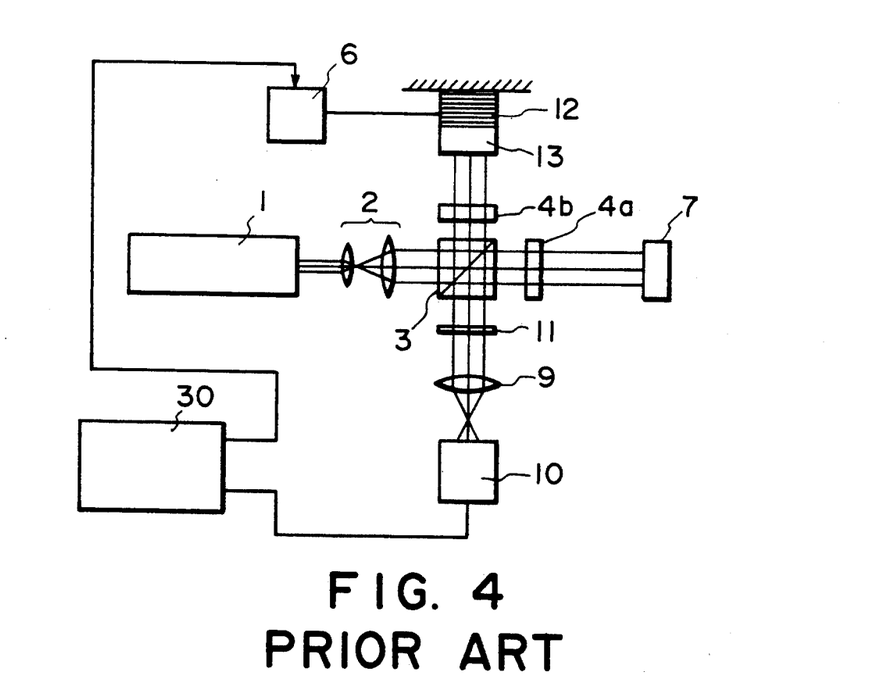

In FIG. 4, reference numeral 12 represents a piezoelectric element 12, 6 a power source for applying a voltage changing with time to the piezoelectric element 12 to expand or compress it in the optical axis direction, 7 an object to be measured, 13 a reference mirror fixedly attached to the piezoelectric element 12, 9 a focussing lens, 10 a photodetector constructed of CCDs or the like, 11 a polarizing plate, and 30 a control circuit.

The diameter of a light beam from the laser light source 1 is made large by the beam expander optical system 2, and applied to the polarized beam splitter 3. In accordance with the polarization direction, the incident light beam is transmitted to the quarter wavelength plate 4a or reflected to the quarter wavelength plate 4b. The transmitted beam component is changed to a circularly polarized wave by the quarter wavelength plate 4a, reflected by the object 7 to be measured, again applied to the quarter wavelength plate 4a with its polarization plane having been rotated by 90 degrees from that when it was first applied thereto, and returned to the polarized beam splitter 3. This beam from the object 7 to be measured is therefore reflected by the polarized beam splitter 3 this time downward as viewed in FIG. 4.

On the other hand, the reflected beam component is changed to a circularly polarized wave by the quarter wavelength plate 4b, reflected by the reference mirror 13 moving in the optical axis direction, again applied to the quarter wavelength plate 4b with its polarization plane having been rotated by 90 degrees from that it was first applied thereto, and then applied to the polarized beam splitter 3. The reflected beam component is then transmitted this time through the polarized beam splitter 3 to be directed downward as viewed in FIG. 4.

The reference light beam from the reference mirror 13 and the light beam from the object 7 are superposed together and applied via the properly disposed polarizing plate 11 and lens 9 to the photodetector 10. Both the light beams interfered with each other at the interface of the polarized beam splitter 3 pass through the polarizing plate 11 so that they are detected with a plurality of light receiving elements of the photodetector 10 as the distribution of interference fringes. An output of the photodetector 10 is supplied to the control circuit 30.

Since the reference mirror 13 moves in the optical axis direction, the phase difference between the reference light beam and the light beam from the object 7 changes to thereby move interference fringes on the photodetector. The moving interference fringe data are picked up in synchronization with the operation of the piezoelectric element 12 by which the reference mirror 13 is caused to move, and analyzed, in the similar manner as the first mentioned prior art, by a computer within the control circuit 30 to thereby measure the configuration or the like of the object 7.

The above prior art is associated, however, with the following problems. Namely, if an object having a large area is to be measured, the diameter of a light beam must be made large correspondingly so that the electro-optical element for generating a reference light beam and the reference mirror must also be made large. This requirement lead to a necessity for a uniform characteristic of the electro-optical element over a certain area and a precise motion of a certain area of the reference mirror in the optical axis direction without any inclination thereof. Sophisticated and highly cumbersome techniques are required in manufacturing such an electro-optical element, piezoelectric element and reference mirror and in positioning the piezoelectric element and reference mirror, thereby resulting in high cost.

Particularly in the prior art shown in FIG. 3 wherein there is used the electro-optical element disposed in the optical path of the reference light to thereby give the light beam a phase difference while it reciprocally propagates the reference light optical path. If the light beam undergoes the extraordinary refractive index of the electro-optical element while it first passes therethrough, the reflected light beam thereafter undergoes the ordinary refractive index of the electro-optical refractive index while it again passes therethrough because the polarization plane has been rotated by 90 degrees (the reverse case is also subjected to the same phenomenon). Since the ordinary and extraordinary refractive indices change oppositely to each other, the phase change amount while the light beam again passes through the electro-optical element is cancelled out. It is therefore necessary to apply a large electric field to the electro-optical element in order to obtain a large phase difference.

Further, in the prior art shown in FIG. 3, as the characteristic of the electro-optical element 5 changes with temperature or the like, only the optical path of the reference light is influenced by the characteristic change so that the relative phase difference between the reference light beam and the light beam reflected from the object becomes less reliable. The resultant measured value is therefore less reliable which is susceptible to a change in external environment such as temperature change.

SUMMARY OF THE INVENTION

It is therefore an object of the present invention to provide an object measuring apparatus using a fringe scanning interference method capable of readily obtaining with high precision a sufficiently large phase difference between a reference light beam and a light beam reflected from an object to be measured.

It is another object of the present invention to provide the apparatus as above which always allows a precise measurement without being influenced by external environment such as temperature change.

DESCRIPTION OF THE PREFERRED EMBODIMENTS

Figure 1:
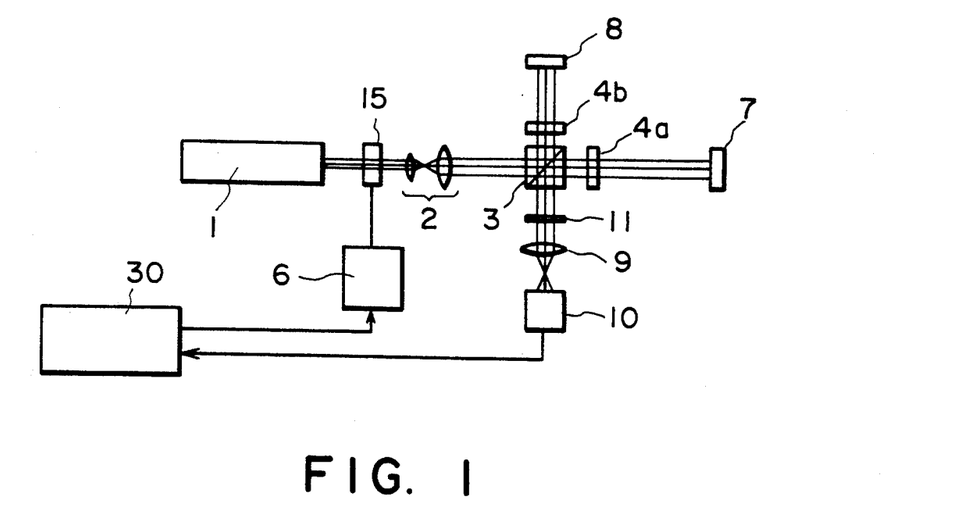
FIG. 1 is a schematic diagram showing the structure of a first embodiment of the object measuring apparatus according to this invention.

FIG. 1 shows the structure of the object measuring apparatus according to the first embodiment of this invention. A difference from the prior art shown in FIG. 3 is that an electro-optical element 15 is disposed at an optical path between a laser light source 1 and a beam expander optical system 2. The laser light source 1 is constructed of, e.g., He-Ne laser, Ar laser, semiconductor laser or the like which generates a coherent laser.

A light beam radiated from the laser light source 1 is first applied to the electro-optical element 15. The electro-optical element 15 is constructed of, e.g., a PLZT plate, and produces optical anisotropy relative to the two directions perpendicular to each other within a plane perpendicular to the incident light beam, upon application of an electric field in the optical axis direction across the electrodes provided at opposite facets of the element 15. Therefore, when a power source 6 receiving an instruction from a control circuit 30 applies a voltage changing with time across the electro-optical element 15, the polarized components of the applied light beam having polarization planes in the two directions perpendicular to each other undergo, respectively as the ordinary and extraordinary light beams, the ordinary and extraordinary refractive indices changing with time. Therefore, the light beams outputted from the electro-optical element 15 have two different phases changing with time depending upon their polarization directions.

In this case, the diameter of the incident light beam to the electro-optical element 15 is relatively small, so that the area of the electro-optical element 15 required to have a uniform characteristic is small. In addition, the ordinary and extraordinary light beam components contained in the output light beam have once passed through the electro-optical element 15 and undergone the ordinary and extraordinary refractive indices changing with time. Therefore, the phase difference and phase change amount of both the components can be made large.

The light beam containing the ordinary and extraordinary light beam components outputted from the electro-optical element 15 is applied to the beam expander optical system 2 whereat the diameter of the light beam is made large to the extent suitable for the dimension of an object 7 to be measured. The light beam with a larger diameter is incident on a polarized beam splitter 3. The polarized beam splitter 3 is disposed, for example, such that the polarization direction of the ordinary light beam component becomes coincident with that of the transmitted light beam component, and the polarization direction of the extraordinary light beam becomes coincident with that of the reflected light beam component.

The ordinary light beam component therefore is transmitted through the polarized beam splitter 3 and quarter wavelength plate 4a, is reflected by the object 7, and applied again to the quarter wavelength plate 4a to return to the polarized beam splitter 3. The ordinary light beam component is then reflected by the polarized beam splitter 3 and directed downward as viewed in FIG. 1 for the same reason as described with respect to FIG. 3.

On the other hand, the extraordinary light beam component is reflected by the polarized beam splitter 3, applied to a quarter wavelength plate 4b, reflected by a reference mirror 8 serving as a reference plane, and again applied to the quarter wavelength plate 4b to return to the polarized beam splitter 3. The extraordinary light beam component then transmits the polarized beam splitter 3 and is directed downward as viewed in FIG. 1 for the same reason as described with respect to FIG. 3.

The ordinary and extraordinary light beam components interfere with each other at the interface of the polarized beam splitter 3, and are passed through a polarization plate 11 and lens 9 to be detected as the interference fringe intensity with a photodetector 10 having a plurality of light receiving elements such as CCDs disposed two-dimensionally.

As the amplitude of the electric field applied to the electro-optical element 15 changes, the phase difference between both the light beam components changes so that the configuration of the surface of the object or the like can be measured through fringe scanning as described with the prior art shown in FIG. 3. The control circuit 30 controls the electro-optical element, determines the data fetching timings, and analyzes the fetched data.

As described above, according to the first embodiment, means constructed of e.g., an electro-optical element 15 for changing the phase difference produces a light beam containing two lightwave components changing the phase difference with time. The light beam is then applied to the interferometer side having the polarized beam splitter 3 and the like. Means for changing the phase difference is therefore sufficient only if it can process a relatively narrow light beam, so that the precision and flexibility of phase difference control is advantageously provided and the cost is lowered.

In addition, even the characteristic of the electro-optical element 15 changes with a change of external environment such as temperature change, the two light beam components change at the same time while maintaining the same relationship so that the measurement precision is not affected adversely.

The second embodiment will be described with reference to FIG. 2. The interferometer side constructed of the polarized beam splitter 3 and the like is the same as the first embodiment shown in FIG. 1. A difference from the first embodiment resides in the means for generating a light beam containing two lightwave components having a phase difference changing with time.

Figure 2:
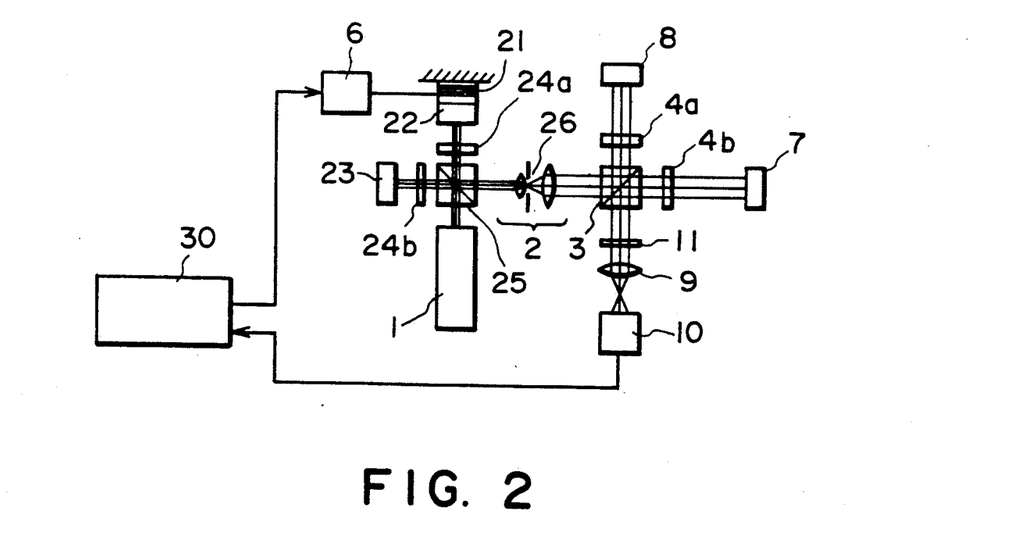
FIG. 2 is a schematic diagram showing the structure of a second embodiment of the object measuring apparatus according to this invention.

In FIG. 2 showing the second embodiment, reference numeral 21 represents a piezoelectric element which is caused to expand and compress in the optical axis direction upon application of a voltage from a power source 6. The expansion/compression state is controlled by a control circuit 30 which controls the voltage generated by the power source 6. The expansion/compression is adapted to be controlled at a precision of 1/100 to 1/1000 wavelength. Reference numeral 22 represents a reflection mirror fixedly attached to the piezoelectric element 21, 23 a fixed reflection mirror, 24a, 24b a quarter wavelength plate, 25 another polarized beam splitter different from the polarized beam splitter 3, and 26 a pin-hole provided in a beam expander optical system 2 for adjusting the shape of a light beam or the like.

A light beam radiated from the laser light source 1 is applied to the polarized beam splitter 25. Depending upon the polarization direction, the light beam is divided into the transmitting light beam component which is directed to the moving mirror 23, and the reflecting light beam component which is directed to the fixed mirror 23. The light beam component transmitted through the polarized beam splitter 25 passes through the quarter wavelength plate 24a, is reflected by the moving mirror 22 to return via the quarter wavelength plate 24a to the polarized beam splitter 25. The optical path length of the transmitted light beam changes with the amount of motion of the mirror 22. Since the light beam passes through the quarter wavelength plate 24a two times, the polarization directions of the beams first and second passing therethrough become perpendicular to each other. The light beam is therefore reflected by the polarized beam splitter 25 and applied to the beam expander optical system 2.

On the other hand, the light beam component reflected by the polarized beam splitter 25 passes through the quarter wavelength plate 24b, and is reflected by the fixed mirror 23 to return via the quarter wavelength plate 24b to the polarized beam splitter 25. Because of principally the same reason as that described with the transmitted light beam component, the reflected light beam component is transmitted through the polarized beam splitter 25 and is applied to the beam expander optical system 2. Both the transmitted and reflected light beam components are thus incident to the beam expander optical system 2.

The relative phase difference of both the light beam components having polarization directions perpendicular to each other is dependent upon the position of the moving mirror 22 changing its position by means of the piezoelectric element 21. The relative phase difference therefore changes with time according to the voltage from the power source 6 which drives the piezoelectric element 21.

It is not intended to be limited to the above-described arrangement where the optical path length of one of the two light beam components is changed to thereby change the relative phase difference, but both the optical path lengths may be changed independently. Any other arrangement may be used if it allows to change the relative phase difference between two lightwave components.

Both the light beam components pass through the beam expander optical system 2 and pin-hole 26 (formed at the position where the focal lengths of two lenses constituting the optical system 2 coincide with each other) to be subjected to wavefront shaping, and are again divided at the polarized beam splitter 3 into the light beams from the moving mirror 22 and fixed mirror 23 one of which is directed to the object 7 and the other to the reference mirror 8.

The operation at the interferometer is essentially the same as that of the first embodiment, so the description therefore is omitted.

Similar to the first embodiment, in the second embodiment, means for changing the phase difference, such as the moving mirror 22 is separated from the interferometer, and a relatively narrow light beam immediately after radiation from the light source is processed to produce a light beam containing two lightwave components having a phase difference changing with time. Degradation of the precision of a phase difference caused by an inclination of the moving mirror 22 or the like can be minimized.

Further, since the pin-hole 16 forms a secondary point light source (light beam containing two lightwave components having perpendicular polarization directions), the light beam directed to the polarized beam splitter 3 is set in a good condition.

We claim:

1. An object measuring apparatus using lightwave interference, comprising:
   first means for generating a light beam containing two lightwave components ar relative phase difference between which can be changed;
   optical means comprising an optical system for focusing said light beam emerging from said first means, and a pin-hole arranged in a focused position of said light beam by said optical system;
   second means for dividing said light beam from said first means into said two lightwave components and directing one of said lightwave components to an object to be measured and the other of said lightwave components to a reference surface;
   third means of producing an interference fringe by making said two lightwave components from said object and reference plane interfere with each other; and
   fourth means for detecting said interference fringe and measuring said object to be measured.

2. An object measuring apparatus according to claim 1, wherein said first means comprises:
   fifth means for producing a light beam containing first and second lightwave components having a phase difference therebetween; and
   sixth means for changing the phase difference between said first and second lightwave components.

3. An object measuring apparatus according to claim 1, wherein said optical means comprises a beam expander optical system.

4. An object measuring apparatus according to claim 3, wherein said first means comprises:
   fifth means for producing a light beam containing first and second lightwave components having a phase difference therebetween; and
   sixth means for changing the phase difference between said first and second lightwave components.

5. An object measuring apparatus using lightwave interference, comprising:
   first means for generating a light beam containing two lightwave components a relative phase difference between which can be changed, said first means comprising a light source for generating a coherent light beam and an electro-optical element having a characteristic that optical anisotropy changes with an electric field applied thereto and being disposed so as to receive a light beam from said light source;
   second means for dividing said light beam from said first means into said two lightwave components and directing one of said lightwave components to an object to be measured and the other of said lightwave components to a reference object;
   third means for producing an interference fringe by making said two lightwave components from said object and reference object interfere with each other; and
   fourth means for detecting said interference fringe and measuring said object.

6. An object measuring apparatus according to claim 5, wherein said light source is a laser light source.

7. An object measuring apparatus according to claim 1, wherein said first means comprises:
   a light source for generating a coherent light beam;
   a beam splitter for dividing a light beam from said light source into two light beams;
   first and second reflection mirrors for reflecting said two light beams divided by said beam splitter, at least one of said first and second reflection mirrors being movable in the optical axis direction;
   control means for controlling the motion state of said movable reflection mirror; and
   a combining optical system for combining the two light beams reflected by said fixed and moving reflection mirrors to form substantially a single light beam.

8. An object measuring apparatus according to claim 7, wherein said movable reflection mirror is fixed to a piezoelectric element, and the motion of said movable reflection mirror is controlled by said control means which controls the amplitude of a voltage applied to said piezoelectric element.

9. An object measuring apparatus according to claim 7, wherein said beam splitter is a polarized beam splitter, and said two lightwave components have a different polarization direction.

10. An object measuring apparatus according to claim 7, wherein said light source is a laser light source.

11. An object measuring apparatus according to claim 1, wherein said fourth means substantially two-dimensionally detects a change in said interference fringe, and measures the configuration of a light applied surface of an object to be inspected.

12. An object measuring apparatus using lightwave interference, comprising:
   a light source for generating a coherent light beam;
   first light beam splitter for dividing a light beam from said light source into two light beams;
   first and second reflection mirrors for reflecting said two light beams divided by said first beam splitter, at least one of said first and second reflection mirrors being movable in he optical axis direction;
   control means for controlling the motion state of said movable reflection mirror;
   a first combining optical system for combining the two light beams reflected by said fixed and moving reflection mirrors to form substantially a single light beam;

a first optical system comprising a lens system for focusing a light beam from said first combining optical system and a pin-hole arranged at a focused position of a light beam by said lens system;

a second light beam splitter for dividing the light beam from said combining optical system into a pair of light beam s and applying one light beam of the pair of light beams to an object and the other light beam of the pair of light beams to a reference object;

a second combining optical system for combining the light beam from said object to be measured and the light beam from said reference object to form an interference fringe; and measuring means including a photodetector for detecting said interference fringe, said measuring means measuring said object in accordance with an output from said photodetector and a control condition of said control means.

13. An object measuring apparatus according to claim 12, wherein said first optical system comprises a beam expander optical system.

14. An object measuring apparatus according to claim 13, wherein a pin-hole is provided at a focused position of said beam expander optical system.

15. An object measuring apparatus according to claim 12, wherein said light source is a laser light source.

16. An object measuring apparatus according to claim 12, wherein said photodetector included in said measuring means includes a plurality of light receiving elements.

17. An object measuring apparatus according to claim 16, wherein said photodetector is a two-dimensional photodetector.

18. An object measuring apparatus according to claim 17, wherein said measuring means two-dimensionally detects a change of said interference fringe with said two-dimensional photodetector, and measures the configuration of a light-applied surface of an object to be inspected.

19. An object measuring apparatus according to claim 12, wherein said first combining optical system comprises said first beam splitter.

20. An object measuring apparatus according to claim 12, wherein said second combining optical system comprises said second beam splitter.

21. An object measuring apparatus using light wave interference, comprising:

two lightwave component forming means for forming a light beam including two lightwave components having a relative phase difference therebetween which is changed in time;

optical means comprising an optical system for focusing said light beam output from said two lightwave component forming means and a pin-hole arrange in a focused position of said light beam by said optical system;

interference means for causing one of said two lightwave components output from said optical means to pass through an optical path to an object to be measured and causing the other of said two lightwave components to pass through an optical path to a reference object, and then causing said two lightwave components to superpose to interfere with each other; and detecting means for detecting a state of the interference by said interference means so that the object can be measured by detection of said detecting means.

22. An object measuring apparatus according to claim 21, wherein said detecting means detects an interference fringe formed by said interference means.

23. An object measuring apparatus according to claim 21, wherein said two lightwave component forming means comprises means for separating said two lightwave components from each other, a moving minor for reflecting one of said two lightwave components separated by said separating means, and means for combining the one of said lightwave components reflected by said moving mirror and the other of said lightwave components.

24. An object measuring apparatus according to claim 23, wherein said separating means and said combining means have a shared beam splitter.

25. An object mesuring apparatus according to claim 21, wherein said optical system constitutes a beam expander for forming a light beam having a larger beam shape than that of incident light on said optical system after the focused light beam has been radiated.

26. An object measuring apparatus according to claim 25, wherein said interference means separates said two lightwave components output from said optical mans, one of which is reflected on said object to be measured, the other of which is reflected on said reference object, and said interference means has a beam splitter for combining said two lightwave components.

27. An object measuring apparatus using lightwave interference e, comprising:

a light source;

an electro-optical element for changing a phase difference between a first lightwave component and a second lightwave component of a light beam from said light source;

an interference optical system for causing said first lightwave component from said electro-optical element to pass through an optical path to an object to be measured and causing said second lightwave component from said electro-optical element to pass through an optical path to a reference object and then causing said first and second lightwave components to superpose to interfere with each other; and a light detector for detecting a state of interference by said interference optical system.

28. An object measuring apparatus using lightwave interference, comprising:

a two lightwave component forming means for forming a light beam including two lightwave components having a relative phase difference therebetween which is changed with time;

optical means comprising an optical system for focusing said light beam from said two lightwave component forming means and a pin-hole arranged in a focused position of said light beam by said optical system;

interference means for causing one of said two lightwave components output from said optical means to pass through an optical path to an object to be measured and causing the other of said two lightwave components to pass through an optical path for reference, and then causing said two lightwave components to superpose to interfere with each other; and detecting means for detecting a condition of the interference by said interference means so that the object can be measured by detection of said detecting means.

29. An object measuring apparatus according to claim 28, wherein said optical path for reference is arranged so that the other of said two lightwave components can reach to a reference surface for detecting the condition of the interference.

30. An object measuring apparatus according to claim 28, wherein said detecting means detects an interference fringe formed by said interference means.

31. An object measuring apparatus according to claim 28, wherein said two lightwave component forming means comprises means for separating said two lightwave components from each other, a moving mirror for reflecting one of said two lightwave components separated by said separating means, and means for combining the one of said lightwave components reflected by said moving mirror and the other of said lightwave components.

32. An object measuring apparatus according to claim 28, wherein said optical system constitutes a beam expander for forming a light beam having a larger beam shape than that of incident light on said optical system after the focused light beam has been radiated.

33. An object measuring apparatus using lightwave interference, comprising:
a light source;
an electro-optical element for changing a phase difference between a firs lightwave component and a second lightwave component of a light beam from said light source;
an interference optical system for causing said first lightwave component from said electro-optical element to pass through an optical path to an object to be measured and causing said second lightwave component from said electro-optical element to pass through an optical path for reference, and thence using said first and second lightwave components to superpose to interfere with each other; and
a detector for detecting a condition of the interference by said interference optical system so that the object can be measured by detection of said detecting means.

34. An object measuring apparatus according to claim 33, wherein said optical path for reference is arranged so that said second lightwave component can reach a reference surface for detecting the condition of the interference.

* * * * *

UNITED STATES PATENT AND TRADEMARK OFFICE
CERTIFICATE OF CORRECTION

PATENT NO. : 5,170,217

DATED : December 8, 1992

INVENTOR(S) : YOSHIFUMI NISHIMOTO ET AL.

Page 1 of 3

It is certified that error appears in the above-identified patent and that said Letters Patent is hereby corrected as shown below: On title page,

AT [56] REFERENCES CITED

U.S. Patent Documents, insert

--4,466,703  8/84  Nishimoto ............
4,564,267  1/86  Nishimoto ............
4,569,039  2/86  Okumura et al. ........
4,758,070  7/88  Nishimoto ............
4,783,152  11/88  Nishimoto ............
4,850,709  7/89  Ban et al. ............
4,907,027  3/90  Kobe et al. ............--.

AT [57] ABSTRACT

Line 6, "ligh-" should read --lightwave--.
Line 7, "twave" should be deleted.

COLUMN 2

Line 26, "is" should read --are--.

COLUMN 3

Line 32, "lead" should read --leads--.

COLUMN 5

Line 43, "object" should read --object,--.

UNITED STATES PATENT AND TRADEMARK OFFICE
CERTIFICATE OF CORRECTION

PATENT NO. : 5,170,217

DATED : December 8, 1992

INVENTOR(S) : YOSHIFUMI NISHIMOTO ET AL.

It is certified that error appears in the above-identified patent and that said Letters Patent is hereby corrected as shown below:

COLUMN 7

Line 8, "23" should read --23,--.
    Line 32, "ar" should read --a--.
    Line 43, "of" should read --for--.

COLUMN 8

Line 54, "light applied" should read --light-applied--.
    Line 59, "first" should read --a first--.
    Line 64, "he" should read --the--.

COLUMN 9

Line 9, "beam s" should read --beams--.
    Line 58, "arrange" should read --arranged--.

COLUMN 10

Line 12, "minor" should read --mirror--.
    Line 28, "mans," should read --means,--.
    Line 33, "e," should read --,--.
    Line 61, "ligh-" should read --lightwave--.
    Line 62, "twave" should be deleted.
    Line 64, "ligh-" should read --lightwave--.
    Line 65, "twave" should be deleted.

UNITED STATES PATENT AND TRADEMARK OFFICE
CERTIFICATE OF CORRECTION

PATENT NO. : 5,170,217

DATED : December 8, 1992

INVENTOR(S) : YOSHIFUMI NISHIMOTO ET AL.

It is certified that error appears in the above-identified patent and that said Letters Patent is hereby corrected as shown below:

<u>COLUMN 12</u>

Line 5, "firs" should read --first--.
  Line 14, "thence using" should read --then causing--.

Signed and Sealed this

First Day of March, 1994

Attest:

BRUCE LEHMAN

Attesting Officer      Commissioner of Patents and Trademarks